United States Patent [19]

Waldhauer et al.

[11] 3,898,564

[45] Aug. 5, 1975

[54] MARGIN MONITORING CIRCUIT FOR REPEATERED DIGITAL TRANSMISSION LINE

[75] Inventors: Frederick Donald Waldhauer, Fair Haven; Dan Holden Wolaver, Middletown, both of N.J.

[73] Assignee: Bell Telephone Laboratories, Incorporated, Murray Hill, N.J.

[22] Filed: Mar. 11, 1974

[21] Appl. No.: 450,168

[52] U.S. Cl. ...................... 325/13; 325/42; 328/164

[51] Int. Cl.² ........................ H04B 3/36; H03H 7/36

[58] Field of Search ............ 325/13, 42, 65; 333/18; 328/164, 167; 179/15 AD, 15 AP, 15 FE, 170 F, 16 E; 178/69 R, 70 R

[56] References Cited

UNITED STATES PATENTS

| | | | |
|---|---|---|---|
| 3,261,986 | 7/1966 | Kawashima et al. | 179/15 AD |
| 3,564,411 | 2/1971 | Seidel | 325/13 |
| 3,727,136 | 4/1973 | Schroeder et al. | 325/42 |
| 3,737,585 | 6/1973 | Ghosh | 179/15 AD |
| 3,745,257 | 7/1973 | Fudemoto et al. | 179/15 AD |
| 3,760,111 | 9/1973 | Sawai | 328/164 |

*Primary Examiner*—Benedict V. Safourek
*Assistant Examiner*—Jin F. Ng
*Attorney, Agent, or Firm*—Wilford L. Wisner

[57] ABSTRACT

The margin against the probable occurrence of errors as well as the actual occurrence of errors, is monitored in an automatically equalized repeater of a digital line of a pulse code modulation communication system. This is done while the system is in service. A model pulse stream derived from a regenerator output by use of a simulated equalized line; the previously equalized pulse stream received at the regenerator input, suitably delayed is compared with the model pulse stream in an analog subtraction circuit to produce an error signal. The error signal may then be peak-detected by a type of peak-detector capable of fast turn-on, to provide an output signal indicative of the occurrence of or margin against regeneration errors. The output signal is available for remote monitoring. The error signal may also be used for adaptive equalization by correlation with signals from the equalizer.

14 Claims, 18 Drawing Figures

MARGIN MONITORING CIRCUIT FOR REPEATERED DIGITAL TRANSMISSION LINE

BACKGROUND OF THE INVENTION

This invention relates to apparatus for monitoring margins against probable occurrence of regeneration errors in a communication system, such as a pulse code modulation communication system.

The recent development of pulse code modulation communication systems has stimulated the development of equalizers which adapt or modify themselves in response to error signals to improve the reliability of the output signal and insure its freedom from distortion. The sampling techniques for deriving an error signal are often cumbersome and deficient at high frequencies.

The same error signal used as the basis for equalization adjustment may also be used to derive a measure of margin against probable occurrence of regeneration error. Existing techniques of estimating margin are both relatively simplistic and also primarily useable on an out-of-service basis. One of the prior techniques involved placing a repeater under unusual stress, for example, a high level of noise or other disturbance tending to induce error.

It is highly desirable to be able to test or monitor repeaters in digital lines in a pulse code modulation system for the margin against errors or for the occurrence of actual errors caused by a variety of troubles without removing the system from service and without requiring the transmitting of any special data pattern or any stressing of the repeaters.

SUMMARY OF THE INVENTION

According to our invention, an error signal is produced in a repeater by first deriving a model pulse stream by passing the output of a regenerator through a simulated equalized line and, second, comparing that pulse stream with the previously equalized pulse stream received at the regenerator input, suitably delayed, to produce an error.

This error signal may be used for adaptive equalization signal. Means are also described for obtaining from the error signal a measure of degradation of margin against errors on account of pulse shape, variation, phase jitter or noise. This technique is also responsive to the actual occurrence of errors.

For low cost and simplicity, the error signal is produced through analog means and without sampling. If the error signal is full-wave rectified and peak-detected, the resulting level is an indication of repeater performance or the margin against regeneration errors.

The error signal may also be used for automatic equalization by correlating the error signal with the effects on the equalized signal of variations in the equalizer circuit.

BRIEF DESCRIPTION OF THE DRAWINGS

Further features and advantages of our invention will become apparent from the following detailed description, taken together with the drawings in which FIG. 1 indicates a repetitive pattern generated by a pulse train affected by noise and distortion.

DESCRIPTION OF ILLUSTRATIVE EMBODIMENT

Figure 1:
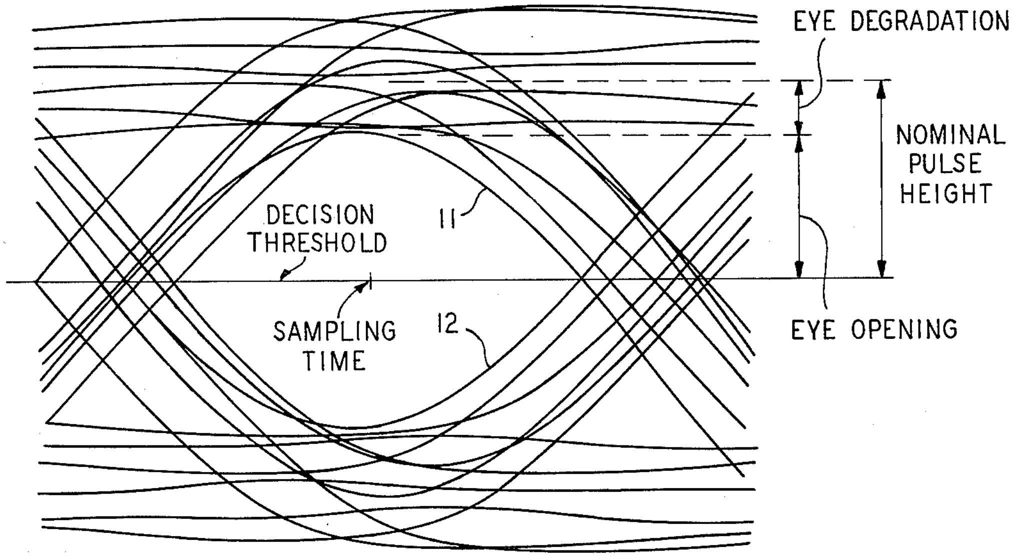
Figure 2:
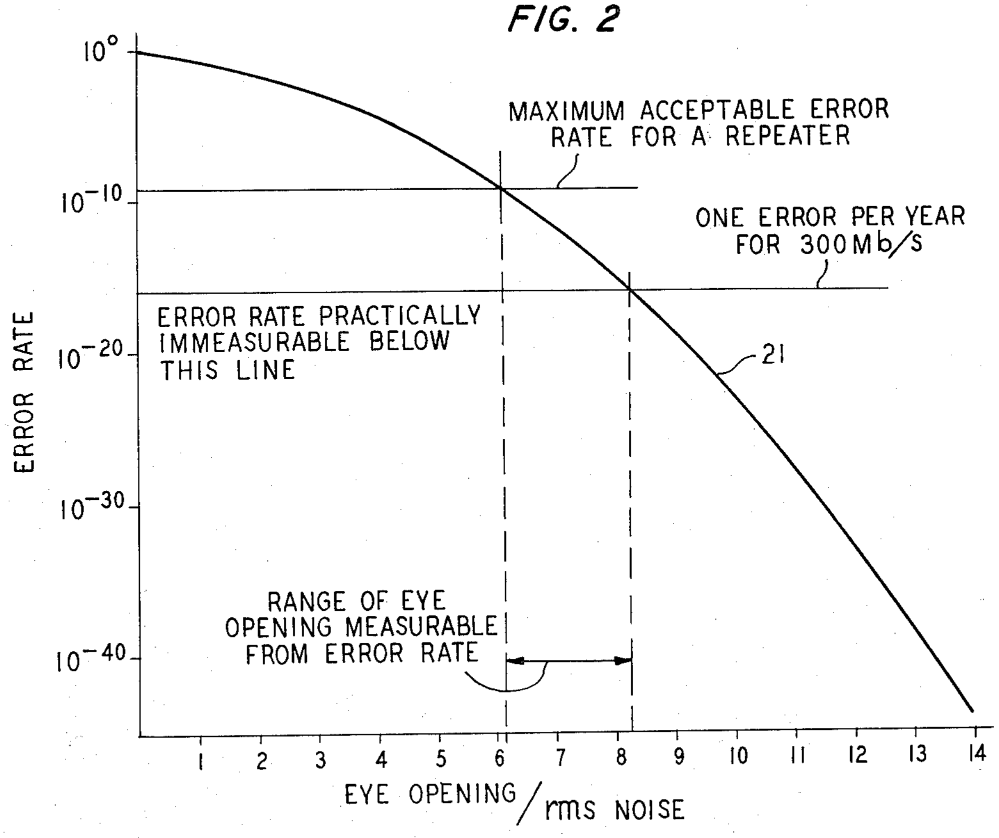
FIG. 2 shows a curve relating the predicted error rate to the ratio of "eye" opening to RMS noise of the received pulse train.
Figure 3:
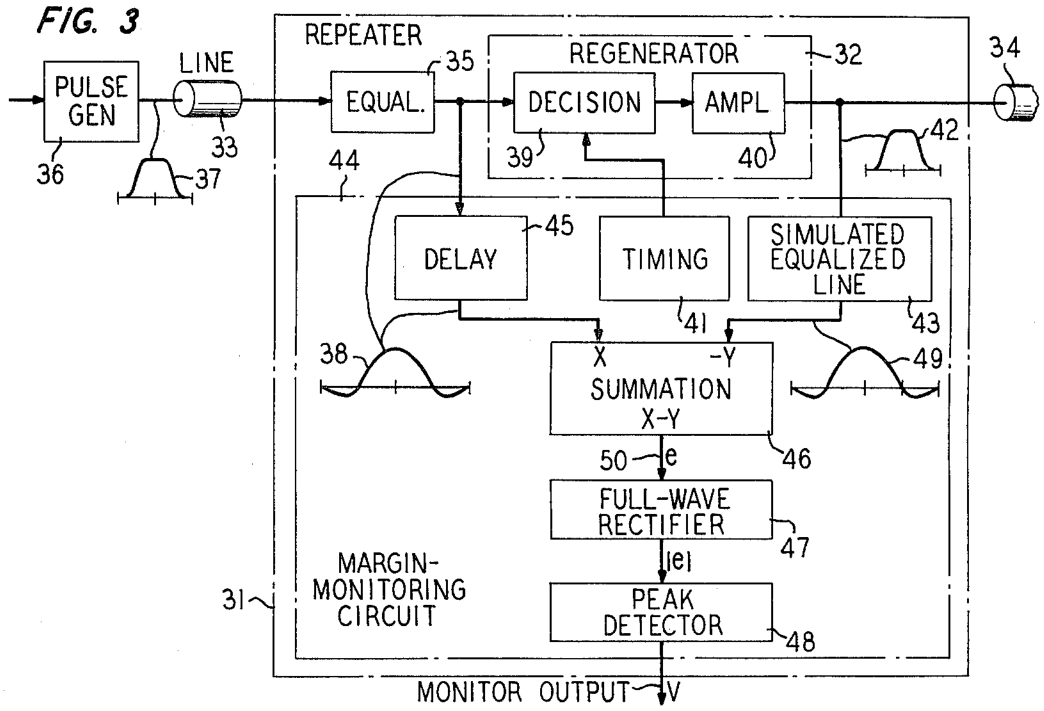
FIG. 3 is a partially pictorial and partially block diagrammatic illustration of the preferred embodiment of the invention.

FIGS. 1 and 2 show curves that generally characterize the transmitted signals of pulse code modulated PCM digital communication systems and specifically illustrate a problem that is presented to the regenerator of each repeater. The position of the repeater 31 and the regenerator 32 within the system are generally illustrated in FIG. 3. In other words, the repeater is positioned between two sections of line 33 and 34; and illustrative equalizer 35 precedes the regenerator 32 within repeater 31.

Referring back now to the curves of FIG. 1, we see a multiplicity of possible equalized pulse patterns traced on top of one another with nominal sampling times aligned. The traces show the phase jitter, interpulse interference and noise with which they arrive at the regenerator 32. In the operation of such a system the ordinate (vertical axis) of the curves 11, 12, 13 and 14 of FIG. 1 indicates electric field amplitude and the abscissa indicates time. The curves 11 and 12 represent the patterns for which the equalized signal presented to the regenerator comes the closest to the decision threshold at the sampling time. The distance from the threshold is called eye opening and is a measure of margin against regenerator error.

The regenerator, in order to make the decision that a pulse is present and should be regenerated or that no pulse is present and no output pulse should be provided, ought to be able to distinguish, at the sampling time, between the closest approaches of curves 11 and 12 to the decision threshold. The eye opening is less than the nominal pulse height by the amount of the eye degradation as indicated in FIG. 1. Factors which contribute to the eye degradation are phase jitter, or timing errors, intersymbol interference arising from imperfect equalization.

A repeater such as that illustrated in FIG. 3 is designed to have large useful margins, that is the ability to tolerate noise and equalizer performance which departs considerably from design specifications and still perform satisfactorily. While some deviations in performance are to be expected, nevertheless, an increasing trend or sudden change in eye degradation would indicate needed maintenance before errors occur or repeaters fail. Thus, something more than fault location is desired in order to be sure that the repeater is within its tolerances. That is, its margins must be checked.

The measure of margin used in digital repeaters for communication is commonly called the "eye opening." When divided by RMS noise, the eye opening is related to probable error rate of the repeater as shown in FIG. 2. A typical repeater is designed to have this ratio equal to approximately 25 to 100. Typically, this ratio may degrade with temperature and time to a ratio as low as 8 without causing a measurable error rate. For the purpose of understanding error rates, it may be noted that at 300 megabits per second an error rate of $10^{-12}$ is 1 error per hour. An error rate of $10^{-16}$ is 1 error per year. Let a repeater with an error rate of $10^{-9}$ or more be defined as failed, and let an error rate of $10^{-16}$ or less be considered unmeasurable. Then, as shown in FIG. 2, the range of eye opening (or margin) measurable from error rate in a non-failed repeater is very narrow. Therefore error rate alone would not be a practical indication of the condition of the repeater except in the case of a failing repeater. In most cases, it is necessary to measure the eye opening in a way that is also responsive to errors in order to find the condition of the repeater.

The problem may be stated in other terms, so that the customer concerned only about actual error can also understand why margin measurement is important to him. First, when a repeater has an excessive error rate only intermittently, that intermittent rash of errors may be due to a low margin. The problem can then be located by margin checking. Second, a repeater may degrade gradually rather than catastrophically. If there is a trend in the condition of the repeater that will lead eventually to an excessive error rate margin, checking will show this trend so that preventive maintenance can be carried out. Periodic margin checking also provides a repeater history so that repeater behavior under field conditions may be better understood in the future.

The repeater and digital line shown in FIG. 3 will now be more specifically described as connected with the margin monitoring equipment of our invention. Let us assume that the pulse code modulated pulse trains in question were originally generated in a pulse generator 36, which provides the input of line 33, with the idealized pulse shape 37.

In general, pulse generator 36 will provide several discrete output amplitudes for pulse 37, in order to provide transmission of more information than the two pulse amplitudes depicted in FIG. 3. The amount of information transmitted per pulse is equal to the logarithm to the base 2 of the number of transmitted levels. For convenience in description of the invention, two transmitted levels are assumed, although the principles of the invention are equally applicable to multi-level transmission. For the two-level transmission system described, the two levels will be balanced with respect to zero voltage, that is, each transmitted pulse 37 will be either positive or negative. Various amplitude and delay distortions of the pulse train and of the differing frequency components of each pulse occur as the pulse train traverses line section 33 even though line 33 may be a high quality coaxial line or waveguide. At the input of repeater 31, the equalizer 35 operates on differing-frequency components of each pulse to compensate for both amplitude and delay distortion in a way that will produce a pulse shape 38 that is readily regenerated by regenerator 32. The slopes and the leading and trailing edges of the pulse shape 38 are not s steep as those of pulse 37 because full equalization at high frequencies would introduce excessive noise. The regenerator 32 typically includes components 39 to make a decision as to whether a pulse is positive or negative and amplifier 40 of conventional type for generating an output pulse when components 39 have sensed the polarity of the incoming pulse. The components 39 of conventional type are controlled by conventional timing circuit 41.

The output of regenerator 32 should be a sequence of pulses with pulse shape 42 that is substantially the same as the output of pulse generator 36 if the repeater is making negligible errors. If these ideally shaped pulses 42 are subjected to the same effects as theoretically occurred in line 33, if it were an ideal line, the result would be the ideal input to repeater 31. Moreover, as pulses 42 are further subjected to effects that are theoretically those of an ideally aligned equalizer 35 the result will be pulses that are the ideal input to the regenerator 32, as shown by pulse 49 in FIG. 1. To produce precisely these pulses, the simulated equalized line 43, to be described in more detail below, is connected to the output of regenerator 32 in parallel with the outgoing section of line 34 to provide one of the PCM pulse trains utilized in margin monitoring circuit 44. Naturally, the output pulses of simulated equalized line 43 are delayed in time compared to the output of equalizer 35 because of their transversal of regenerator 32 and the circuit 43. Otherwise, they are an ideal set of reference pulses if regenerator 32 has operated properly. In a practical system, line 33 and equalizer 35 will never operate precisely as was theoretically expected, so the output pulses 38 of equalizer 35 should be less perfect then the output pulses 49 of simulated equalized line 43, assuming that regenerator 32 is operating perfectly.

A delay circuit 45 is connected to the output of equalizer 35 in parallel with the input of regenerator 32 to provide a pulse train like that received at regenerator 32, but suitably delayed for purposes of comparison with the output of simulated equalized line 43. Delay circuit 45 and simulated equalized line both have their outputs connected to respective inputs of the analog summation or difference circuit 46, of conventional type. The resulting error signal 50 will have a detailed high frequency structure which will accurately sense various degradations in the equalizer 35, cable 33, timing circuit 41, or pulse generator 36. In accordance with one embodiment of the invention, this difference signal 50 may be cross-correlated with various potential correction signals in the equalizer 35, and the result of this correlation process used to control these same correction signals, so to reduce the difference between the input signal 38 to regnerator 32 and the ideal model signal 49. This is described below in connection with FIG. 18. As described below, however, the peak value of the error signal 50 is a reliable measure of the loss of repeater margin, essentially equivalent to the eye degradation of FIG. 1. To obtain this peak value of error signal 50, full wave rectifier 47 and peak-detector 48, to be described more fully hereinafter are illustratively connected in tandem in that sequence to the output of summation circuit 46. The output of peak-detector 48 is the desired signal which will yield much information about both the performance of line 33 and equalizer 35 and about the performance of regenerator 32.

The assumption that the output of regenerator 32 is ideal and that the output train of pulses 49 from the simulated equalized line 43 is a suitable standard for reference during margin monitoring is justified when the regenerator is making errors at a low rate (less than $10^{-6}$). Since the "eye opening" of interest is that which exists at an equalizer output, the maximum difference between the two signals applied to summation circuit 46 is the desired measure of eye degradation or, broadly, margin degradation, i.e., that which exists at the input to regenerator 32 and which will indicate the margin against regenerator error.

If there are variations in the decision threshold in circuit 39 that are so small as not to cause regenerator errors, signal 42 will be unaffected. Then the margin will be reduced without affecting the difference signal from summation circuit 46. Therefore, margin degradation due to threshold offset must be measured by some of the prior art techniques such as stressing the regenerator. But the need for such supplementary techniques is largely avoided by the present invention because degradation of margin, other than that due to threshold offset, can be observed by means of the circuit of FIG. 3 without supplementary technique such as repeater stressing. The operation of the repeater is not interfered with so that margin checking can be done in service. No particular data pattern is needed. Also, a low margin in one repeater will not prevent the measurement of margin in the following repeater.

The operation of the circuit of FIG. 3 may be more specifically described in one embodiment as follows: the output pulse 37 generated by the previous repeater is approximately a trapezoid one time slot wide at the half height. After passing through the line segment 33 and the equalizer 35, the pulse is now rounded but still passes, as nearly as possible through zero at the sampling times.

If the regenerator makes no errors, it generates a data signal with a pulse sequence the same as that of the output of the previous repeater, except for a delay. When this signal is passed through the simulated equalized line 43 the effect is that of a filter which approximates the effect of the line segment 33 followed by the correct equalization, which the equalizer 35 should also have provided for the pulses from line segment 33. As stated above, the output of the simulated equalized line 43 should be a model reference signal. Therefore, if the previous equalization is correct, the output pulse 38 from equalizer 35 should be the same as the corresponding output pulses 49 of simulated equalized line 43 except for a delay.

If the repeater is operated very nearly as it was designed to operate, then the difference signal $e(t)$ at the input to circuit 46 will be very nearly zero. If the equalization is imperfect, if the regenerator 32 makes an error, or if the timing phase is off, then the signals being compared will differ; and $e(t)$ will depart from zero.

The peak magnitude of $e(t)$ is a measure of the degradation or reduced margins in the repeater related directly to eye opening, errors, and sampling offset. The spreading of the traces 11 and 12 at the top and bottom of the eye opening in FIG. 1 is typically mainly caused by intersymbol interference. The spreading results in eye degradation, as indicated. When the eye is closed, the regenerator can no longer distinguish with certainty between positive and negative pulses.

Because of bandwidth and circuit limitations, an equalizer will not yield 0 percent eye degradation even when it is aligned correctly. Let the eye degradation for a good equalizer operating as designed be called the "nominal eye degradation."

Figure 4:
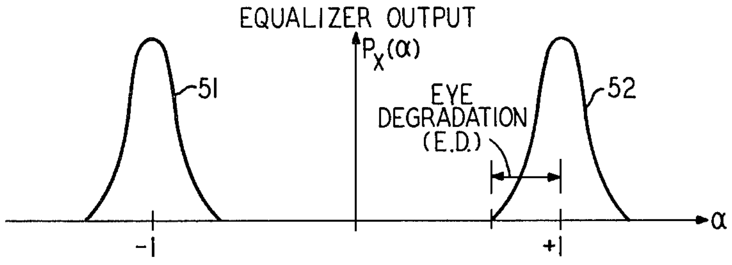
FIGS. 4 through 11 show curves which are usable in explaining the operation of the invention.

Since eye degradation is defined at the sampling times, let us consider the signals in FIG. 3 at the sampling times. FIG. 4 via curves 51 and 52 shows typical probability densities $P_x(\alpha)$ at the sampling times $\alpha = +1, -1$ for the equalizer output $x$, FIG. 5 via curves 53 and 54 shows the analogous densities for the simulated equalized line output $y$, and FIG. 6 via curve 55 shows the analogous density for summation output $e = x - y$. The nominal pulse height is taken as unity. The spread of $P_x(\alpha)$ about +1 and −1 is due to intersymbol interference. The width of the spread is twice the eye degradation. In a similar manner the width of the spread of $P_y(\alpha)$ about +1 and −1 is twice the eye degradation of the reference signal $y$ at the output of the simulated equalized line. Let the eye degradation of the reference signal $y$ be called the reference eye degradation. Since the simulated equalized line signal $y$ is designed to produce the nominal pulse, the reference eye degradation is very nearly the nominal eye degradation.

With the regenerator threshold at zero, as it should be there is the following relation between the signals $x$ and $y$:

$$x > 0 \rightarrow y > 0$$
$$x < 0 \rightarrow y < 0$$

The result is that the probability density $P_{x-y}(\alpha)$ of the difference signal has one lobe centered about zero. Its spread is 2M, where M is related to the eye degradation (E.D.) and the reference eye degradation (R.E.D.) by $$|\text{E.D.}-\text{R.E.D.}| \leq M \leq |\text{E.D.}+\text{R.E.D.}|$$

Note that the eye degradation should not be less than the reference eye degradation and that both quantities are positive. Therefore the magnitude symbols above are not actually needed.

The signal $e = x - y$ is full-wave rectified and peak detected. We have not determined the peak value of $|e|$ over all time, but we know the peak value of $|e|$ at the sampling times to be M. Therefore this is a lower bound on the peak value V of $|e|$.

$$V = \max_t |e|$$
$$\geq M$$
$$\geq \text{E.D.}-\text{R.E.D.} \quad (1)$$

Then one can obtain a pessimistic estimate of the eye degradation by adding the reference eye degradation to the monitor output V. The uncertainty in the estimation is dependent on the reference eye degradation and on the difference between the degradation at the center and at the edge of the eye.

Figure 7:
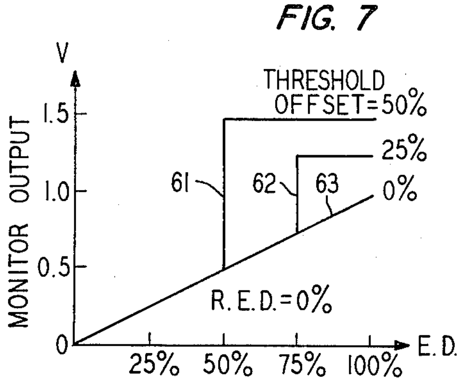
Figure 8:
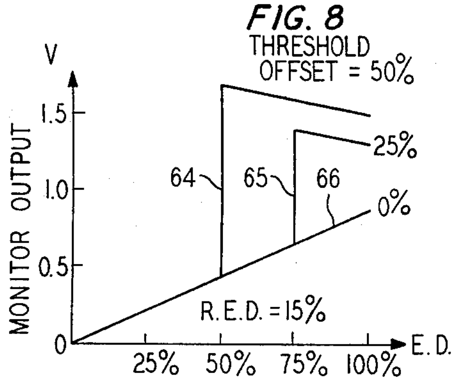

FIGS. 7 and 8 show the monitor response to intersymbol interference assuming that the equality in Equation 1 holds, and assuming the maximum departure from the nominal signal is at the center of the eye. The estimate for eye degradation E.D. $\doteq$ V + R.E.D. is correct in this case. If either assumption does not hold, the estimate will be too high, and therefore conservative.

In obtaining an estimate of the eye degradation, the output of the simulated equalized line was used as a reference to which the equalizer output was compared. We will turn the tables to some extent in detecting a faulty repeater output due to threshold offset. When the decision threshold of the regenerator is greatly offset, the error rate can be excessive without much eye degradation. It will be seen that the difference signal $e$ is large when an error at the repeater output (filtered by the simulated equalized line) is compared with the equalizer output.

To assess the operation of the circuit for threshold offset for the monitoring of which the circuit of FIG. 3 is not especially adapted, suppose that the decision threshold of the regenerator is at some positive value $\beta$.

Figure 5:
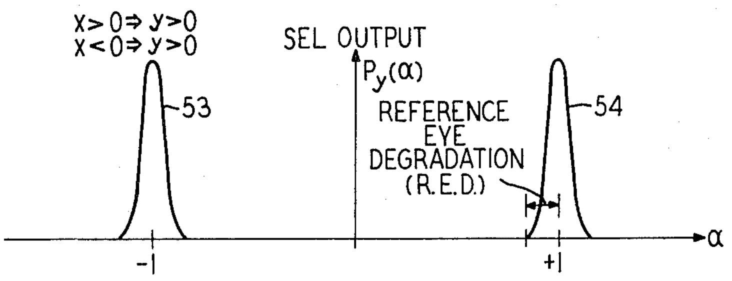
Figure 6:
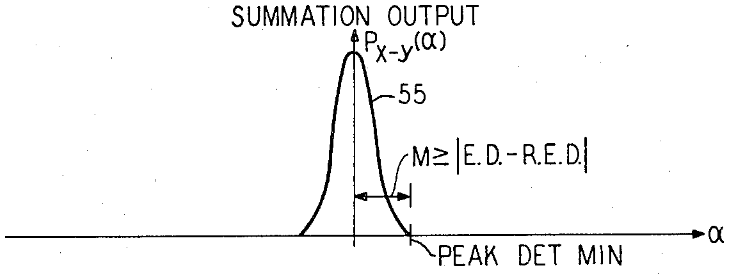

The probability functions (not shown) corresponding to the threshold offsets monitor output curves 61–66 of FIGS. 7 and 8 will now be formed from the probability functions of FIGS. 4–6 by shifting to the right in FIGS. 4–6 the portion of the probability function to the left of the threshold and by shifting to the left the portion of the probability function to the right of the threshold. But now because of the threshold offset the probability function has a small portion of area A at a value greater than unity. This portion of the function will be sensed by the peak-detector if it is large enough. The peak-detector of FIG. 3, as will become clearer from the following detailed description with reference to FIG. 13, has a decaying memory and can sense this new source of degraded performance only if the signal contains a level sufficiently large with a duty cycle greater than some minimum $d_o$. That minimum should be small enough to be less than or equal to the area of the signal at a value of $\alpha$ greater than unity. When this condition is satisfied, the peak-detector output will "jump" to a high value when the error rate due to threshold offset exceeds that minimum level. Other than as just described, the monitoring circuit of FIG. 3 does not detect degradation due to threshold offset.

The present monitoring technique will produce a characteristic output responsive to noise. Both the effects of interpulse interference and the effects of noise cause the probability density $P_x(\alpha)$ and the related monitor output to grow, but with different characteristics. The probability density of interpulse interference goes to zero rapidly at the extreme giving a well-defined edge to the eye. The probability density of Gaussian noise goes to zero only asymptotically, giving a fuzzy edge to the eye.

Figure 9:
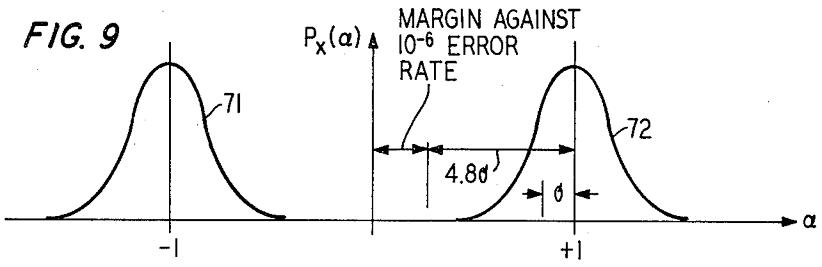
Figure 10:
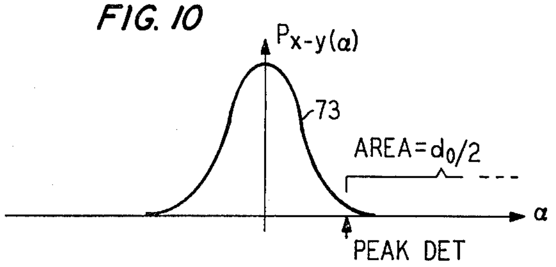

FIGS. 9 and 10 in curves 71, 72 and 73 show the probability density $P_x(\alpha)$ of the equalizer output and $P_{x-y}(\alpha)$ of the summation circuit output for the case of no intersymbol interference and high Gaussian noise. With no well defined edge to the eye it is difficult to define eye opening. However, we can still speak of the margin against a certain error rate, say $10^{-6}$. The area beyond the $4.8\sigma$ point of a Gaussian density function is $10^{-6}$. Therefore in curves 71 and 72, the distance from the $4.8\sigma$ point to the origin would be the margin under ideal conditions against an error rate of $10^{-6}$. Considering the probability density $P_{x-y}(\alpha)$ in curve 73, the distance from the $4.8\sigma$ point to the origin is the actual *reduced* margin against $10^{-6}$ error rate due to noise.

Suppose that the minimum duty cycle for a level to be detected by the peak detector is $d_o$. Then the monitor output will reach a level V such that the area under $P_{x-y}(\alpha)$ for $\alpha > V$ is $d_o/2$. (The factor of 2 is due to the full-wave rectification before peak detection.) For instance, if $d_o = 2\times10^{-6}$, then $V = 4.8\ \sigma$.

Figure 11:
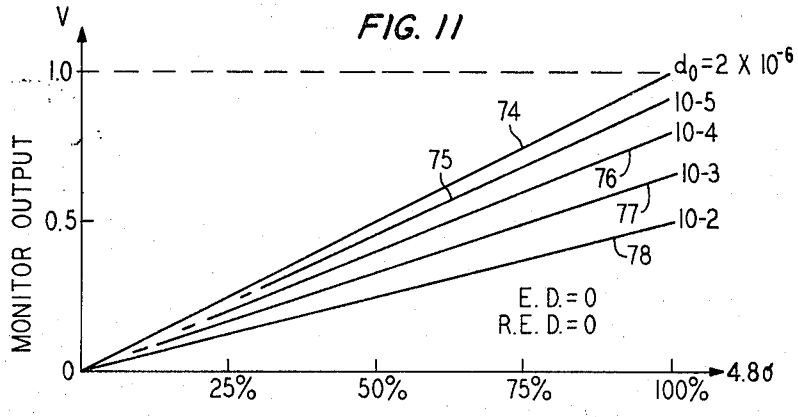

The reduced margin against $10^{-6}$ error rate (E.R.) is equal to $4.8\sigma$. FIG. 11 in curves 74–78 shows the monitor response to noise level for different values of $d_o$. The curves are given by $$V = \eta(4.8\ \sigma)$$

where $\eta$ is dependent on $d_o$:

| $d_o$ | n |
|---|---|
| $2\times10^{-6}$ | 1.00 |
| $10^{-5}$ | 0.92 |
| $10^{-4}$ | 0.81 |
| $10^{-3}$ | 0.69 |
| $10^{-2}$ | 0.54 |

It is desirable to have $d_o = 2\times10^{-6}$ so the monitor response is unity when the error rate reaches $10^{-6}$ and causes an alarm (by conventional means not shown).

An important parameter in the decision-making process is the sampling time. When the sampling is offset from the center of the eye pattern, the opening at the sampling time is reduced. The reduction is the eye degradation due to sampling offset. If the sampling offset did not affect signal $x$ or signal $y$, this degradation would not be observed until the error rate became excessive. However, the phase of the sampling pulse determines the phase of the repeater output pulse. Therefore, a phase shift of the simulated equalized line output $x$ accompanies a sampling offset; and it is possible to sense sampling pulse offset before it causes an excessive error rate.

As a result of phase shift, the peak-detector 48 of FIG. 3 senses larger peak differences of the input signals ($x$—$y$) than before the degradation. It can be shown that the data pattern in this case gives as large a peak difference V($\theta$), that is, voltage V as a function of phase shift angle $\theta$, as any other pattern of degradation. The relationship is $$V(\theta) = 2\sin(|\theta|/4),\ |\theta| \leq 360°.$$

Because $V(\theta)$ is only an indirect measure of eye degradation due to sampling offset, one will ask whether it over- or under-rates the effect of sampling offset, and by how much. The eye degradation $q(\theta)$ due to sampling offset $\theta$ is given approximately by $$q(\theta) = 1 - \cos(\theta/2),\ |\theta| \leq 180°.$$

The peak detector output is never less than the eye degradation. It does over-rate the effect of sampling offset, however.

In order to indicate the true condition of the repeater, the monitor output should equal the eye degradation due to sampling offset. The greatest difference occurs at 50 percent effective eye degradation, for which the monitor output indicates 100 percent degradation.

It is possible to identify eye degradation due to sampling offset by a special type of out-of-service stressing. By changing the frequency of the data signal transmitted over a line, the phase of the sampling pulse in each repeater can be shifted, say, over a range of ±60°. By observing the monitor output, the curve V($\theta$) can be plotted, giving the sampling offset $\theta$ and the eye degradation for $\theta = 0$.

A well-designed monitoring system should monitor the condition of the entire repeater, including itself. The monitoring of the equalizer 35 condition (intersymbol interference) and decision circuit 39 (threshold and sampling offsets) has been described. It remains to show how the output amplifier 40 and monitoring system 44 can be tested for proper operation.

The repeater output filtered by the simulated equalized line 43 is used as a reference in determining the eye degradation of the equalizer output. If it happens that the output amplifier or simulated equalized line is faulty and the equalizer is well aligned (produces a nearly nominal pulse), then the roles are reversed. The equalizer output serves as a reference for measuring the degradation of the signal $y$ due to the faulty pulse generator or simulated equalized line.

It is possible for simultaneous faults to degrade both signal $x$ and signal $y$ (e.g., both are low amplitude or zero). In that case the monitor output will not report the degradation properly, and an independent test is necessary to recognize the situation. We will test the signal $y$ since it is reasonable to assume that it will not be distorted without also having the wrong peak amplitude. Thus, the condition of both the pulse generator and the simulated equalized line can be tested by peak detecting the simulated equalized line output $y$.

Figure 12:
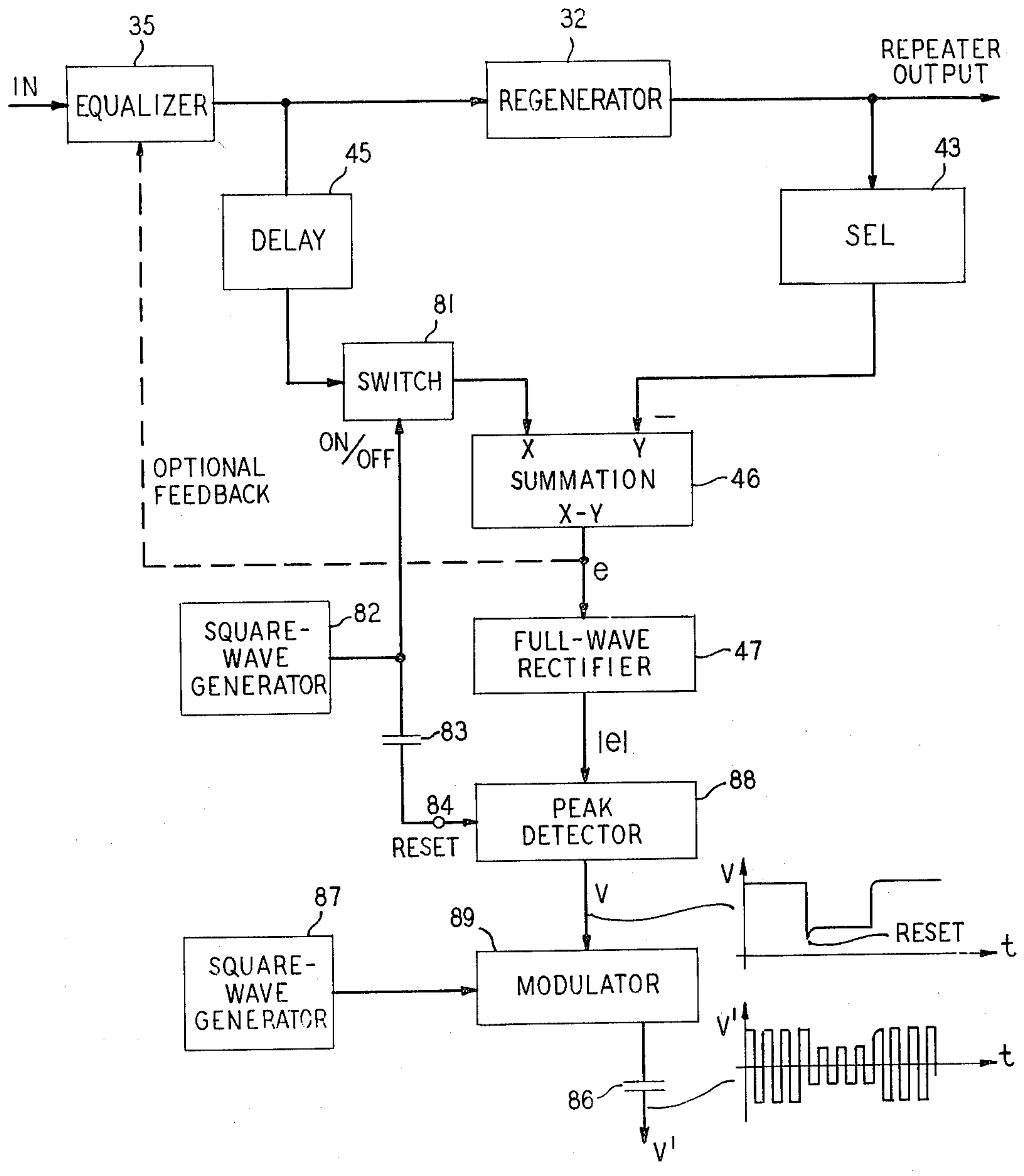
FIG. 12 is a block diagrammatic illustration of a modification of the embodiment of FIG. 3.

A means for doing this is shown in FIG. 12. By switching the $x$ input from delay circuit 45, to the summation circuit by switch 81, the summation output can be made to be either the difference $x—y$ or the simulated equalized line output $y$ alone. The switch is controlled by a square-wave generator 82 at a low rate (300 Hz). In this way the monitor output alternates between a measure of the margin $$\max_t (|x-y|)$$

and a measure of the simulated equalized line output amplitude $$\left(\max_t |y|\right).$$

Figure 13:
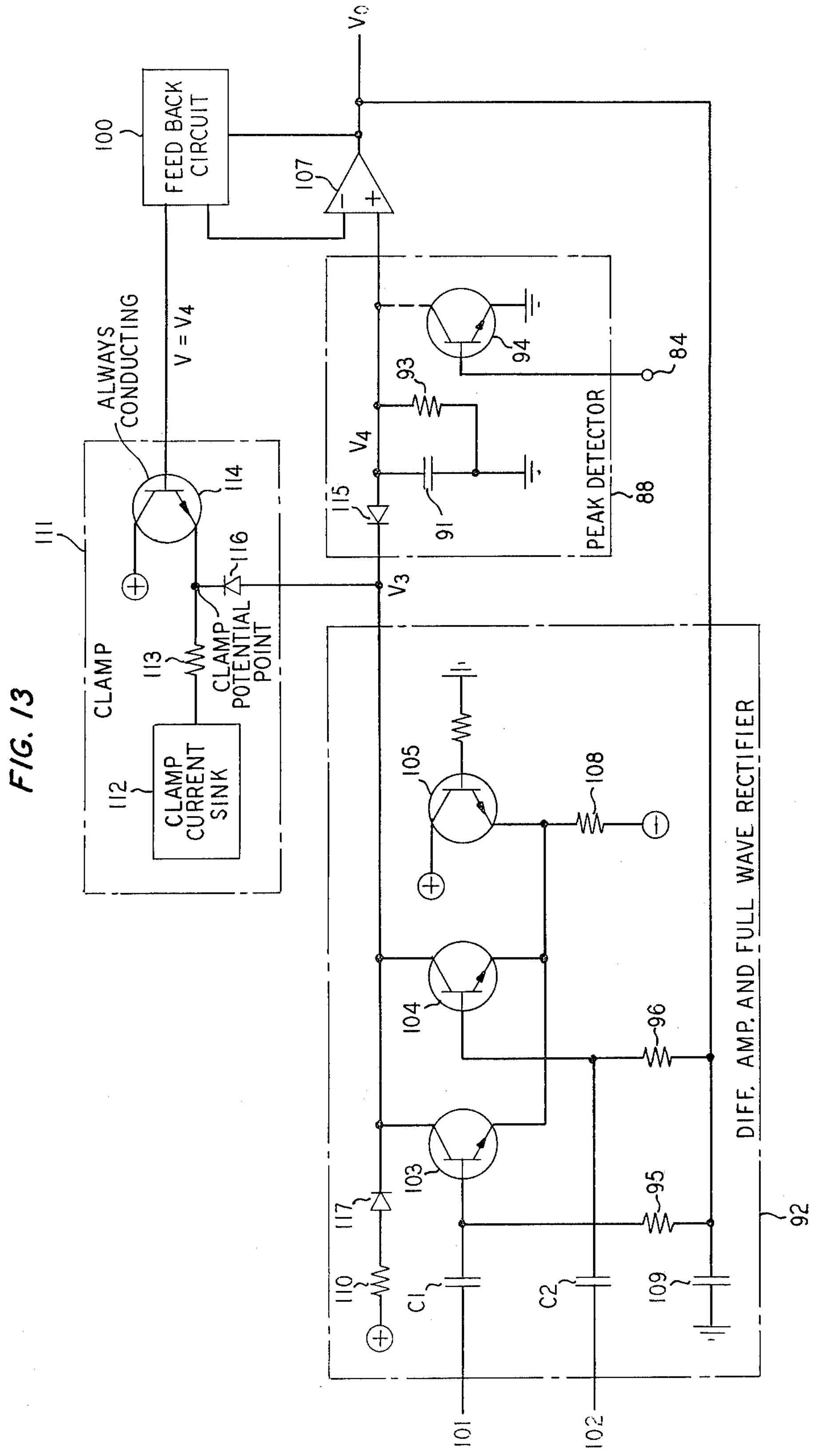
FIG. 13 is a schematic illustration of the detailed circuitry of the peak detector employing clamping of the bias of the detection element during its non-conduction period.

A slight modification of the peak detector is necessary to enable it to follow the changing signal at its input. The peak detector has no trouble in going to a high value when the switch is opened and the simulated equalized line output appears at its input. However, by the nature of a peak detector, it takes a long time to decay to a lower value when the switch closes and the difference signal $|x—y|$ appears at its input. Therefore it is necessary to provide a reset connection 84 through a capacitor 83 that will momentarily discharge the capacitor 91 (in FIG. 13) in the peak detector 88 when the reset switch 94 closes. Illustratively, the reset connection 84 would drive a transistor 94 in FIG. 13, the emitter-collector circuit of which shunts the storage capacitor 91 of the peak detector. Refer to FIG. 13.

The line-powered repeater may have a chassis ground which is 1100 volts above earth ground. Therefore the monitor output must be ac coupled through capacitor 86 to the outside world. The monitor output contains information all the way down to dc, so it must be modulated to get through the ac coupling.

FIG. 12 shows a single scheme for monitor output modulation. The output of the peak detector is multiplied in modulator 89 by a square wave from generator 87 with a frequency of about 30 kHz. Other modulation means, such as PCM, FM, or PWM may also be employed.

A more detailed circuit description of the suggested component circuits will now be given based upon the schematic diagram of FIG. 13. It is assumed in FIG. 13 that the error signal and its inverse have been obtained from summation circuit 46, of conventional type to provide a balanced output and applied to inputs 101 and 102. These inputs are ac coupled to the bases of transistors 103 and 104, respectively. Part of the amplifier 92 simultaneously takes the difference between signals 101 and 102, and peak detects the difference. Amplifier 92 includes transistors 103 and 104, which give full-wave rectification of the input signal. Transistors 103 and 104 also provide amplification and also respond to the negative feedback signal from the output appearing across capacitor 109. Amplifier 107 is not shown in more detail because it is a conventional high-gain operational amplifier.

The amplifier 92 includes transistors 103, 104, and 105, the bases of transistors of 103, and 104 being ac-coupled to line 43 and switch 81, respectively.

The bases of transistors 103 and 104 are connected to the dc output voltage $V_o$ through a feedback circuit including capacitor 109, the dc voltage $V_o$ being equal to the peak difference voltage previously appearing at the bases of transistors 103 and 104. The amplifier 92 supplies dc level shifting and isolation for the following peak detector circuit 98. If the voltage of the base of either transistor 103 or 104 exceeds the voltage on the emitter of transistor 105, which is biased near ground potential when transistor 103 and 104 are off, then the input signal to that transistor exceeds the negative feedback voltage on capacitor 109. That transistor conducts, causing the voltages at the base and emitter of the following transistor 105 to rise, producing a negative feedback effect. If the difference between the input signals is sufficient, the additional current through resistor 110 will drive voltage V3 sufficiently negative to turn-on peak-detector diode 115. Diode 115 of peak detector circuit 88 conducts, charging the storage capacitor 91. The voltage on capacitor 109 follows the voltage on capacitor 91 and eventually accepts a peak negative voltage proportional in magnitude to the peak difference between the voltages at inputs 101 and 102.

If $I_c$ is the charging current and $d$ is the duty cycle of $I_c$, then $$dI_c = I_i$$

$$d \geqslant {}_i/I_c(\max)$$

For an $I_c(\max)$ of 20 mA, the minimum duty cycle which the circuit can peak detect is $$d_o = I_i I_c(\max) = (200\ \text{nA})/(20\ \text{mA}) = 10^{-5}$$

A $d_o$ of $10^{-6}$ could be achieved by using a "super input" operational amplifier with an $I_i$ of 20 mA. Also in this circuit the capacitor 91 may be shunted by a reset semiconductor switch such as the base emitter circuit of transistor 94 shown connected to the output of peak-detector circuit 88 by dotted connections to indicate that it is an optional circuit.

The clamping circuit 111 in FIG. 13 clamps the voltage across peak-detecting diode 115 to substantially 0 volts when diode 115 is not conducting. Circuit 111 is supplied at the biase of transistor 114 with a buffered amplified potential equal to $V_4$, the voltage at the output of diode 115. Clamp current sink 112 provides a potential so negative that even when connected through resistance 113 to the emitter of transistor 114, transistor 114, is always forward biased and conducting. As a result, the clamp potential point, at the emitter of transistor 114 is always one base-emitter junction voltage drop below $V_4$. This forward-biased junction drop is substantially equal to the voltage drop of one forward-biased diode. For brevity, it will be called one diode drop. The clamp potential is one diode drop below $V_4$.

As diode 116 conducts, whenever $V_3$ starts to rise, $V_3$ is clamped at one diode drop above the clamp potential. In other words, $V_3$ is clamped at $V_4$; and diode 115 is just barely turned off.

Consequently, diode 115 is protected against reverse voltage and is also enabled to turn on more quickly when $V_3$ starts to go more negative than $V_4$, because it is not necessary to discharge the diode capacitance of diode 115, or parasitic capacitance of the connections to diode 115. This response capability is needed at the illustrative 287 MHz operating frequency of the regenerator 32. (see FIG. 12).

Figure 14:
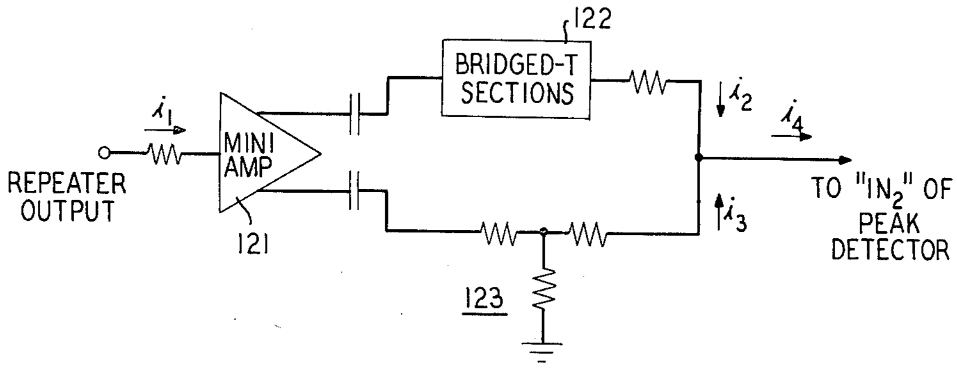
FIG. 14 shows a partially schematic and partially block diagrammatic illustration of one version of a simulated equalized line for use in the invention.
Figure 15:
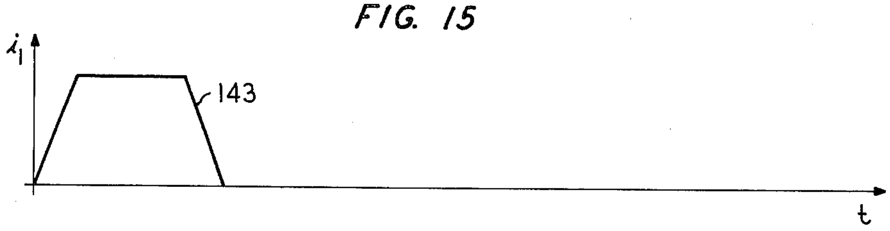
FIGS. 15 and 16 show curves useful in explaining the output of the simulated equalized line.

The simulated equalized line 43 of FIGS. 3 or 12 is shown in more detail in FIG. 14 and includes an operational amplifier 121 having twin outputs connected respectively to bridged-T sections 122 shown in FIG. 15 and to the reference bridge-T circuit 123. The output of circuits 122 and 123 are connected together in current summing fashion to the first input of summation circuit 46, e.g., to input 101 of FIG. 13.

Delay lines are used in the bridged-T sections 122 to achieve a response that stretches the input difference signal pulse but ends quickly. Additional pulse shaping is done by reducing the bandwidth of operational amplifier 122, for example to a bandwidth of about 83 MHz for a system with parameters described above.

Figure 16:
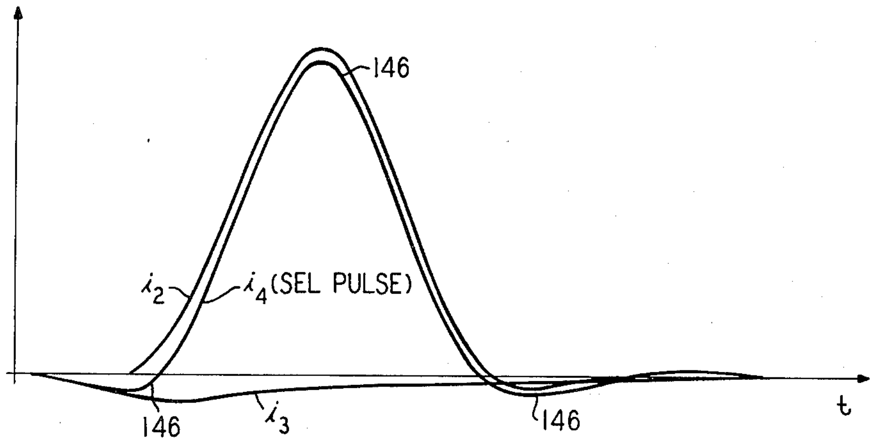
Figure 17:
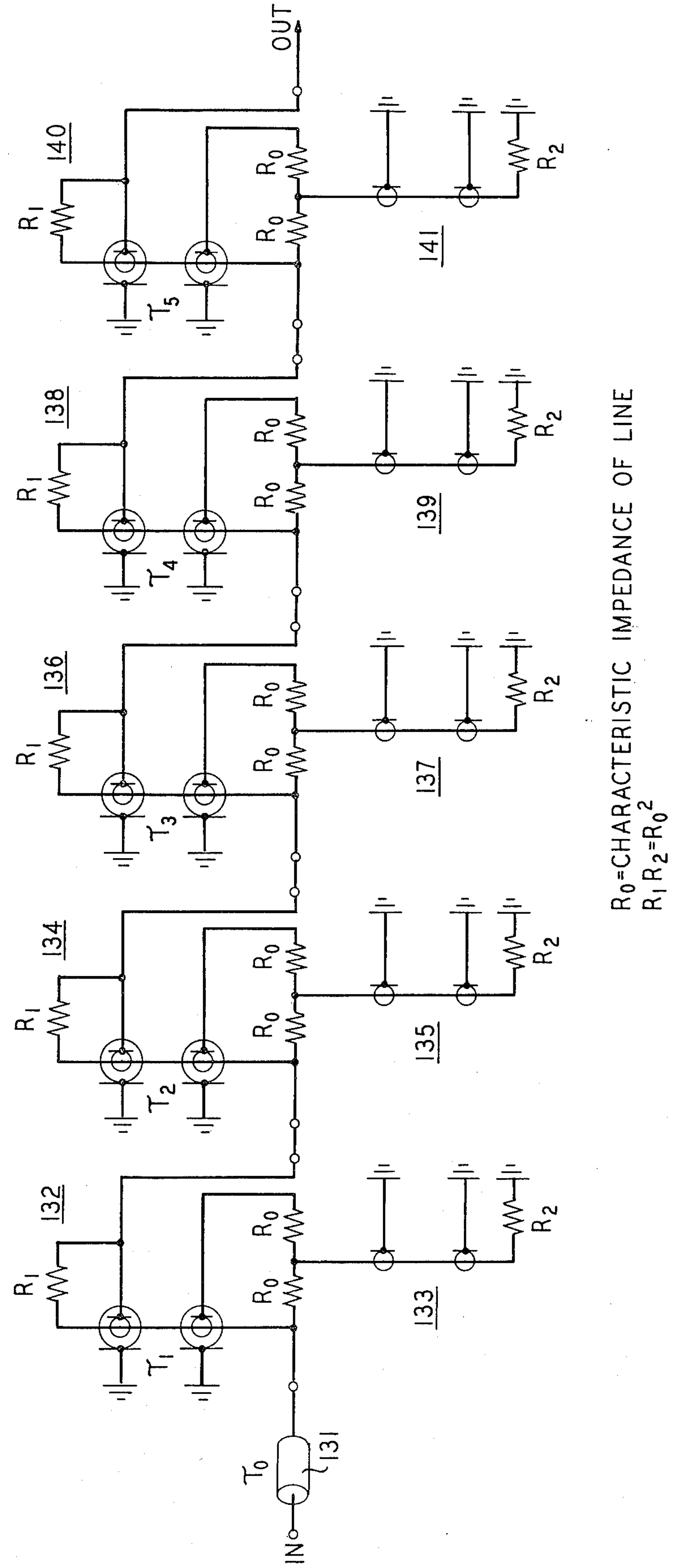
FIG. 17 shows the bridged-T sections of FIG. 14 in more detail.

The bridged-T sections 122 are shown in detail in FIG. 17, specifically the bridge-T sections includes a section of input transmission line 131, a section of triaxial delay line 132 having a first delay $\tau_1$ and a balanced resistive-T 133 shunting delay line 132 and having an open-ended line stub forming the leg of the T. See U.S. Pat. No. 3,723,912, issued Mar. 27, 1973, to R. A. Thatch. The next bridge section includes a section of delay line 134 having the next selected increment of delay greater than that of the first section 132, e.g., delay $\tau_2$. Delay line section 134 is shunted by resistive T 135 similar to T 133. Similarly, cascaded with the bridged-T sections just described are further bridged-T sections 136, 138, 140 with progressively increased $\tau_3$, $\tau_4$, and $\tau_5$ and including respectively resistive-T 137 resistive-T 139 and resistive-T 141. The standard resistive-T 123 in FIG. 14 serves the function of splitting the signal from operational amplifier 91, the main pulse being delayed through the successive delay sections and then summed with the output of T section 93 at the output of the simulated equalized line 43. This circuit as shown in FIG. 17 is sometimes called a precursor circuit. Both the precursor edge and the postcursor edge of the nominal pulse from regenerator 32 and of the pulse from simulated equalized line 43 are designed to be about 6% of the peak height so that the proper zero crossings are opened. This desired form has been obtained satisfactorily with the limitation that the precursor pulse goes down to only about 5%, as shown by curve 146 of FIG. 16.

While the foregoing apparatus has been described on a system performance basis of margin monitoring for a 280 megabit per second repeatered line, it should be understood that the same principles can be applied to any repeatered digital line regardless of the design frequency of operation. In principal, the equalized signal is compared with the reference signal generated in the repeater; and the difference between the two signals are then peak-detected. Both equalization degradation due to the interpulse interference and degradation due to sampling offset are measured on an in-service basis although the former is more accurately measured than the latter.

Further, because no special data pattern is needed to measure the margin of the repeater by the described circuit, a high error rate in a preceding repeater does not interfere with the measurement of margin in the following repeater. Thus the margin of all repeaters in a repeatered line can be independently observed. It is also found that noise produces predictable patterns in the peak-detected signal.

A further use of the described embodiments of FIG. 3 involves the measurement of the transmission medium. In FIG. 3, the output of peak-detector 48 is related to imperfections in the line 33 and the equalizer 35. If the regenerator is carefully adjusted to introduce as small an output as possible, with a line having nearly ideal characteristics, the output of peak-detector 48 will be related closely to imperfections in the transmission medium.

Figure 18:
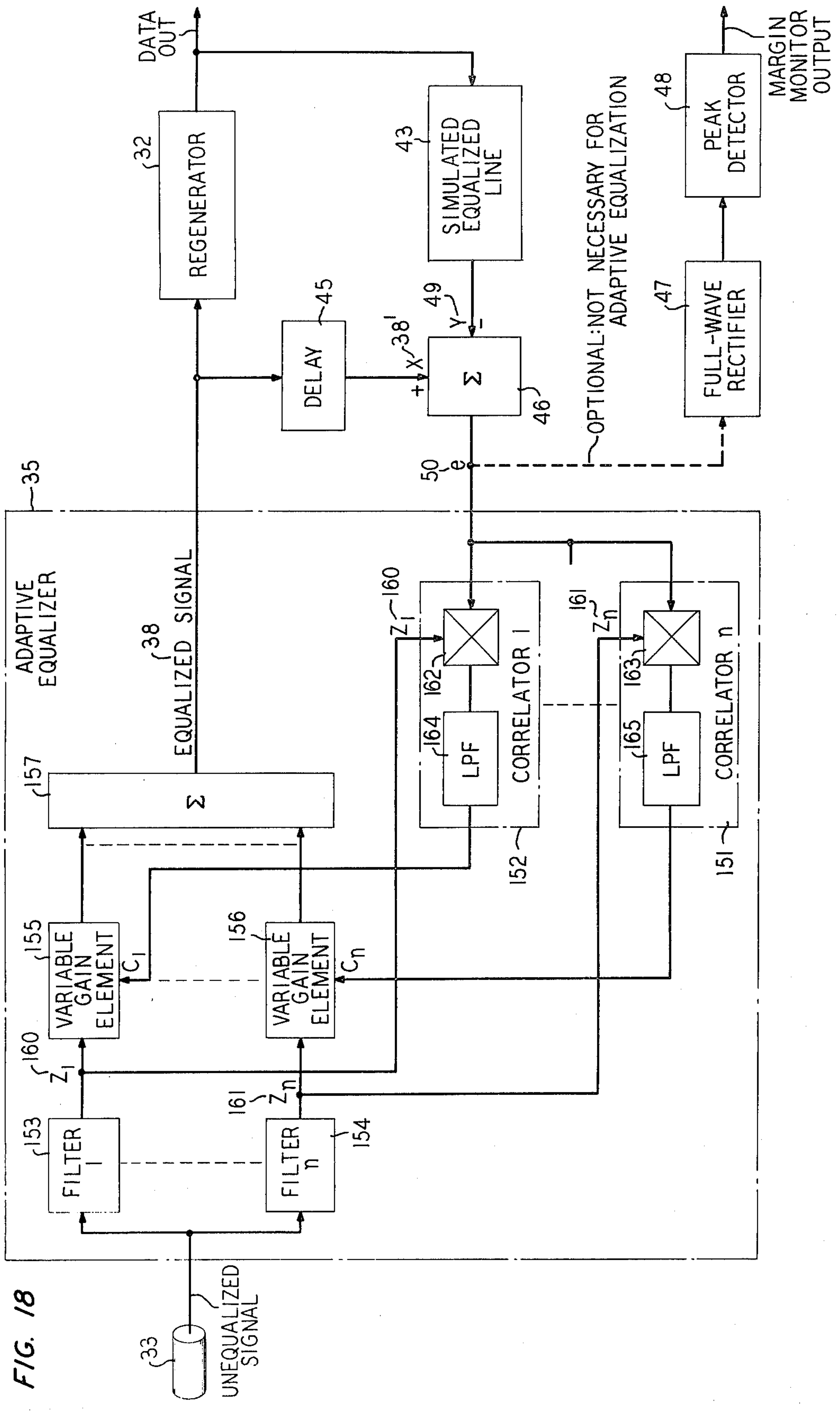
FIG. 18 is a partially pictorial and partially block diagrammatic illustration of an adaptive equalizer in accordance with the invention.

A still further use of the error signal involves modified adaptive equalization responding to the error signal 50 and may be implemented by either feedback or feedforward control. Illustratively, FIG. 18 shows that equalizer 35 may consist of several parallel filter paths 153 and 154 with adjustable gains 155 and 156 whose outputs are finally summed in circuit 157 to produce an equalized signal 38. Such a variable equalizer may be made adaptive to changing condition by a type of feedback involving the error signal 50.

The feedback illustrated in FIG. 18 uses correlation techniques described by Narendra and McBride in a paper entitled "Multiparameter Self-Optimizing Systems Using Correlation Techniques" in the *IEEE Transaction on Automatic Control*, Vol. 9, p. 31, January, 1964. The parallel path structure is an example of a class of adaptive equalizers, all of which employ correlation of an error signal which is the difference between a desired signal 49 and a realized signal 38'. The error signal 50 is correlated in circuit 152 including multiplier 162 and low pass filter 164 with signal 160 from the equalizer 35. Variable gain element 155 is responsive to the output of correlator 152 and adjusts the amount of signal 160 contributing to the equalized signal 38.

An optional feedback connection from peak-detector 48 to equalizer 35 is symbolically shown in FIG. 12. The added signals would be generated in equalizer 35 in response to the signal in the optional connection circuit 150. When switch 81 is off, and only the *y* signal from similated equalized line 43 is being checked, the feedback loop for adaptive equalization is broken. During this time, therefore, the equalizer settings must be held fixed.

What is claimed is:

1. In a regenerative repeater for regenerating digital signals passed as pulse signals through a transmission medium, said repeater including an equalizer and connected in tandem with said equalizer a regenerator having means for admitting an input pulse signal from said equalizer and means for producing a regenerated output pulse signal, and means for deriving information about the margin against regenerative error in said repeater comprising means for generating a model pulse signal from said regenerator output pulse signal, means for delaying said regenerator input pulse signal, means for comparing said delayed regenerator input signal with said model pulse signal, and means responsive to said comparison for deriving an error signal containing said information.

2. In a regenerative repeater for regenerating digital pulse signals passed through a transmission medium, said repeater including in tandem an equalizer receiving said signals and a regenerator having an inherent signal delay and having an input circuit connected to said equalizer and an output circuit from which the regenerator output pulse signal issues after said signal delay, means for deriving information about the margin against regenerative error in said repeater comprising means for generating a model pulse signal from said regenerator output signal comprising filtering means connected to said regenerator output circuit for simulating the pulse shaping of passing said digital signals through an ideal medium and an ideal equalizer, means for delaying said regenerator input signal by the signal delay of said regenerator, means comparing said model pulse signal with said delayed regenerator input signal for providing an error signal containing said information, and means responsive to said comparing means for utilizing said error signal.

3. Apparatus for regeneration of digital pulse signals passed through a transmission medium, comprising a repeater including an equalizer and a regenerator having an inherent signal delay and having an input circuit connected to said equalizer and an output circuit from which the regenerator output pulse signal issues after said signal delay, means for deriving information about the margin against regenerative error in said repeater comprising means for generating a model pulse signal from said regenerator output signal comprising filtering means connected to said regenerator output circuit for simulating the pulse shaping of passing said digital signals through an ideal transmission medium and an ideal equalizer, means for delaying said regenerator input signal by the signal delay of said regenerator, and means comparing said model pulse signal with said delayed regenerator input signal to produce an error signal, and means responsive to said comparing means for utilizing said error signal comprising means for peak-detecting said error signal to provide a direct indication of said margin.

4. Apparatus for regeneration of digital pulse signals passed through a transmission medium, comprising a repeater including an equalizer and a regenerator having having an inherent signal delay and having an input circuit connected to said equalizer and an output circuit from which the regenerator output pulse signal issues after said signal delay, means for deriving information about the margin against regenerative error in said repeater comprising means for generating a model pulse signal from said regenerator output signal comprising filtering means connected to said regenerator output circuit for simulating the pulse shaping of passing said digital signals through an ideal transmission medium and an ideal equalizer, means for delaying said regenerator input signal by the signal delay of said regenerator, means comparing said model pulse signal with said delayed regenerator input signal to produce an error signal, and means responsive to said error signal for adjusting said equalizer to increase said margin of said repeater.

5. In a regenerative repeater for regenerating digital pulse signals passed through a transmission medium, said repeater including an equalizer and a regenerator having an inherent signal delay and having an input circuit connected to said equalizer and an output circuit from which the regenerator output pulse signal issues after said signal delay, means for deriving information about the margin against regenerative error in said repeater comprising means for generating a model pulse signal from said regenerator output signal comprising filtering means connected to said regenerator output circuit for simulating the pulse shaping of passing said digital signals through an ideal medium and an ideal equalizer, means for delaying said regenerator input signal by the signal delay of said regenerator, means for comparing said model pulse signal with said delayed regenerator input signal, and means including correlation means responding to said comparing means and to said equalizer for adjusting said equalizer to increase said margin of said repeater.

6. Apparatus for regeneration of digital pulse signals passed through a transmission medium, comprising a repeater including an equalizer including filtering means for a portion of the transmitted spectrum and a regenerator having an inherent signal delay and having an input circuit connected to said equalizer and an output circuit from which the regenerator output pulse signal issues after said signal delay, means for deriving information about the margin against regenerative error in said repeater comprising means for generating a model pulse signal from said regenerator output signal comprising filtering means connected to said output terminals for simulating the pulse shaping of passing said digital signals through an ideal transmission medium and an ideal equalizer, means for delaying signals proportional to the signals from said equalizer by the signal delay of said regenerator, means comparing said model pulse signal with said delayed regenerator input signal to produce an error signal, and means including at least one correlator responsive to the error signal and to a signal from the filtering means in the equalizer for adjusting said equalizer to increase said margin of said repeater.

7. Apparatus according to claim 6 in which said correlator includes means for multiplying the error signal by a signal transmitted by the filtering means in the equalizer, said filtering means comprising band-pass filter means connected in said equalizer for producing said transmitted signal, said correlator including low-pass filtering means in tandem with said multiplying means.

8. Apparatus for regeneration of digital pulse signals passed through a transmission medium, comprising a repeater including an equalizer and a regenerator having an inherent signal delay and having an input circuit connected to said equalizer and an output circuit from which the regenerator output pulse signal issues after said signal delay, means for deriving information about the margin against regenerative error in said repeater comprising means for generating a model pulse signal from said regenerator output signal comprising filtering means connected to said output terminals for simulating the pulse shaping of passing said digital signals through an ideal transmission medium and an ideal equalizer, means for delaying said regenerator input signal by the signal delay of said regenerator, means comparing said model pulse signal with said delayed regenerator input signal to produce a difference signal, and means for peak-rectifying said difference signal to yield an analog signal as an indication of margin against regeneration errors.

9. Apparatus for regeneration of digital signals in a first digital transmission line, comprising a threshold-detecting and amplifying means for regenerating a stream of pulses in response to pulses received from said line, means for deriving information about the margin against regeneration errors in said repeater comprising means coupled to the regenerating means for deriving a model stream of pulses, said deriving means including means for simulating an ideal equalized section of digital transmission line, means responsive to the pulses received from said first line for producing a delayed stream of pulses replicating the received pulses, means for comparing the model stream and delayed stream to produce an analog difference signal, and means coupled to the comparing means for peak-detecting the difference signal to yield an analog signal as an indication of the margin against regeneration errors.

10. Apparatus according to claim 9 in which the peak-detecting means includes a detecting diode and means for clamping the potential across the detecting diode in its off condition to substantially 0 volts regardless of the value of the peak-detected signal.

11. Apparatus according to claim 9 including means for disabling the comparing means partially, so that the peak-detecting means detects variations in the peak value of the pulse stream from the simulated equalized section of digital transmission line.

12. Apparatus according to claim 11 in which the disabling means includes a detecting diode and a switch connected between the delayed pulse stream producing means and the comparing means, and means for driving said switch periodically, said driving means including means connected to the peak-detecting means for resetting the peak-detecting means.

13. Apparatus according to claim 12 including means for modulating the output of the peak-detecting means for transmission to points remote from the regenerating means.

14. Apparatus according to claim 9 in which the means for simulating an ideal equalized section of digital transmission line includes means for splitting the pulse energy received from the regenerating means into two paths, the first path including a resistive bridged-T and the second path including a plurality of bridged-T sections having respective different transmission delays, and means for recombining pulses from the two paths at the output of said simulating means.

* * * * *

UNITED STATES PATENT AND TRADEMARK OFFICE

CERTIFICATE OF CORRECTION

PATENT NO. : 3,898,564

DATED : August 5, 1975

INVENTOR(S) : Frederick D. Waldhauer and Dan H. Wolaver

It is certified that error appears in the above-identified patent and that said Letters Patent are hereby corrected as shown below:

Column 4, line 1, "s steep" should read --as steep--;
Column 4, line 54, "regnerator" should read --regenerator--.
Column 8, line 12, "n" should read --η--.
Column 10, line 54, that portion of the formula reading "$d \geq {}_i/Ic(max)$" should read --$d \geq I_i/I_c$--;
Column 10, line 68, "0" should read --zero (0)--.

Signed and Sealed this

*second* Day of *December 1975*

[SEAL]

*Attest:*

RUTH C. MASON
*Attesting Officer*

C. MARSHALL DANN
*Commissioner of Patents and Trademarks*